H. FOSTER, W. C. TURNER, C. E. BENNETT & W. B. LINN.
AUTOMATIC GASOLENE VENDING APPARATUS.
APPLICATION FILED AUG. 21, 1914.
1,153,376.
Patented Sept. 14, 1915.
2 SHEETS—SHEET 2.
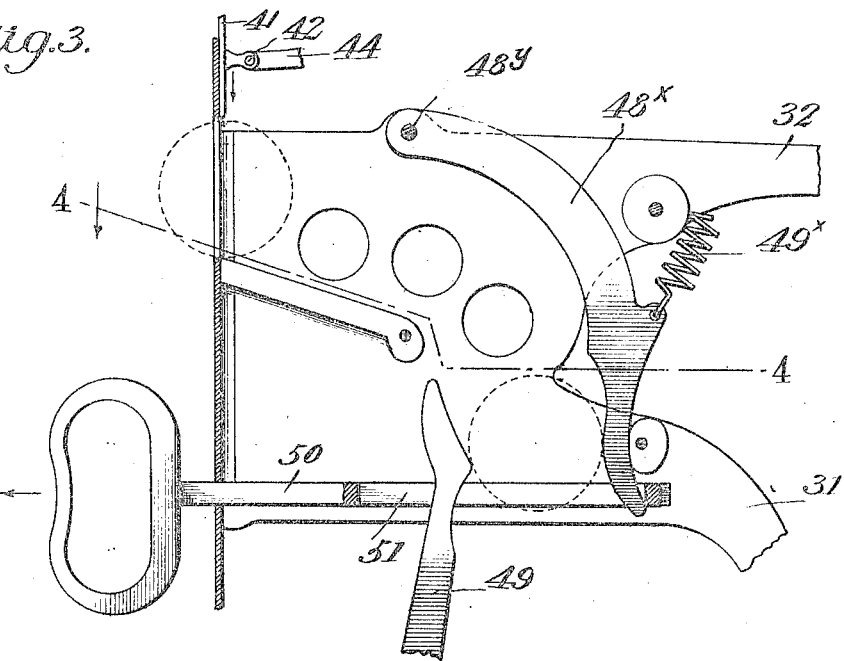
Fig. 3.
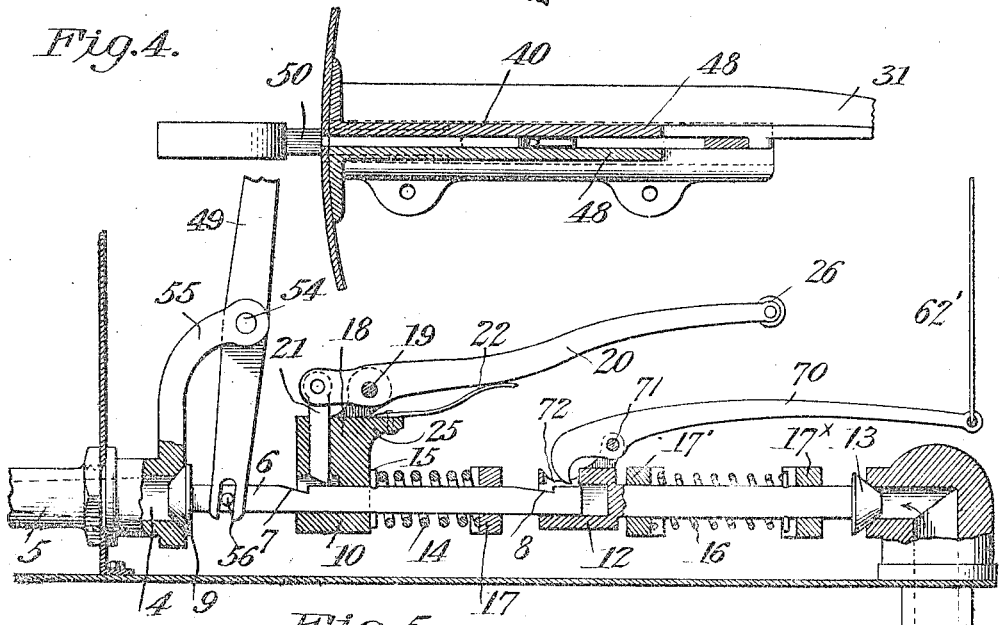
Fig. 4.
Fig. 5.
Witnesses
Inventors
H. Foster
W. C. Turner
C. E. Bennett
W. B. Linn
By Franklin H. Hough
Attorney

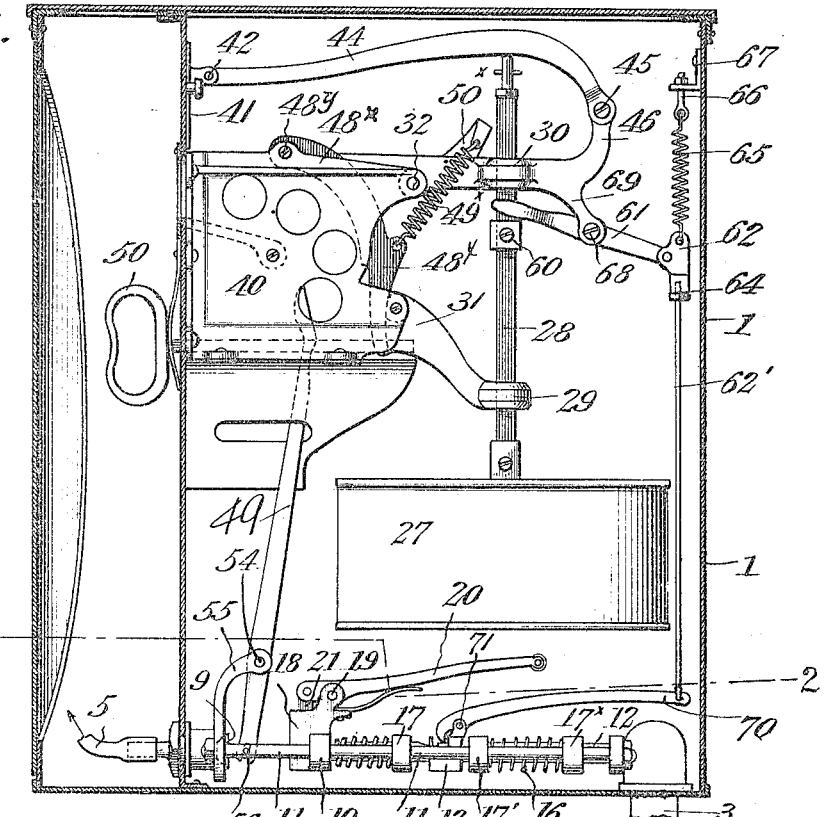
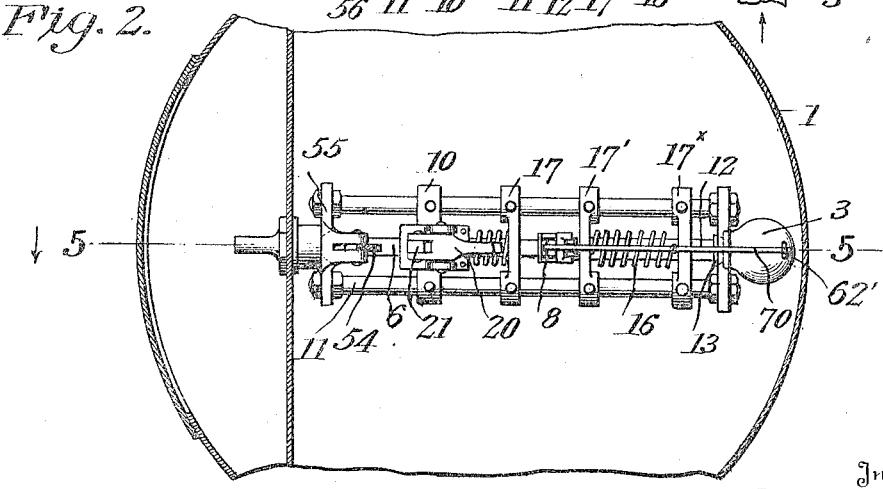

UNITED STATES PATENT OFFICE.

HOMER FOSTER, WILLIAM C. TURNER, CLARENCE E. BENNETT, AND WALTER B. LINN, OF CASEY, ILLINOIS.

AUTOMATIC GASOLENE-VENDING APPARATUS.

1,153,376.

Specification of Letters Patent.

Patented Sept. 14, 1915.

Application filed August 21, 1914. Serial No. 857,940.

*To all whom it may concern:*

Be it known that we, HOMER FOSTER, WILLIAM C. TURNER, CLARENCE E. BENNETT, and WALTER B. LINN, citizens of the United States, residing at Casey, in the county of Clark and State of Illinois, have invented certain new and useful Improvements in Automatic Gasolene-Vending Apparatus; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in automatic gasolene vending apparatus and comprises a simple and efficient device of this nature having various details of construction, combinations and arrangements of parts which will be hereinafter fully described, shown in the accompanying drawings and then specifically defined in the appended claims.

Our invention is illustrated in the accompanying drawings, in which:

Figure 1 is a central vertical sectional view through the apparatus. Fig. 2 is a transverse section on line 2—2 of Fig. 1; Fig. 3 is a sectional view through the coin receiving slot. Fig. 4 is a cross sectional view on line 4—4 of Fig. 3, and Fig. 5 is an enlarged detail sectional view through the valve-controlling mechanism, on line 5—5 of Fig. 2.

Reference now being had to the details of the drawings by numerals, 1 designates a tank made of any suitable size adapted for holding a measured quantity of liquid to be dispensed. A valved inlet pipe 3 leads to and communicates with the lower portion of the tank and an exit passageway 4 leads therefrom and to which a tube 5 is connected. A horizontally disposed valve stem 6 is provided with notches 7 and 8 and an exit valve 9 is fastened to one end of the stem and regulates the exit passageway. Said stem is mounted to have a sliding movement in the bearings 10 and 17, supported upon the rods 11 fastened to the lower portion of the tank. Said stem is adapted to telescope within a hollow stem 12 to which an inlet valve 13 is fastened and adapted to control the inlet through which the liquid is allowed to pass into the tank.

A coiled spring, designated by numeral 14, is mounted upon said stem and bears against a pin 15 fixed to the stem and a bearing member 17. A second coiled spring 16 is mounted upon said hollow stem and has a bearing intermediate the bearing member 17' and a bearing 17$^x$. Said spring 16 is lighter than the spring 14 for a purpose which will presently appear. One side of said bearing 10 has an integral housing 18 which carries a pivotal pin 19 upon which a float-operated lever 20 is pivotally mounted and a pawl 21 is pivotally connected to the short end of said lever and works vertically in the housing 18 and is adapted to engage the notch 7, being thrown into engagement therewith by the spring 22 which is interposed between a finger 25 upon said housing and the lever, as shown clearly in the drawing. The lever 20 is provided with an anti-friction roller 26 and is positioned underneath the float 27, which latter has a stem 28 which has a longitudinally sliding movement through the bearings 29 and 30, formed respectively upon the arms 31 and 32 and which latter are secured to the wall of the tank.

40 designates a coin chute which is closed by means of the slide 41 during the dispensing of the liquid from the tank, said slide being pivotally connected at 42 to one end of the lever 44 which is pivotally mounted upon a pin 45 carried by a finger 46 upon the arm 32. It will be noted that the upper end of the float stem is adapted to contact with the under edge of the lever 44 for the purpose of tilting the lever and throwing the slide from over the coin slot when the tank refills, causing the float to rise therein.

The coin slot leads into a space intermediate the two plates 48 which are spaced apart and between which the upper end of the lever 49 passes, and 50 designates a pull bar which has a longitudinal slot 51 therein through which the upper end of the lever 49 passes. A curved plate, designated by numeral 48$^x$, is pivotally mounted upon a pin 48$^y$, and a spring 49$^x$ is fastened at one end to a projecting lug of the plate and its other end secured to a lug 50$^x$ upon the arm 32. The free end of the plate 48$^x$ passes through said slot in the pull bar 50 and the inner curved edge of the plate is adapted to push the coin against the lever and cause the same to tilt as the bar 50 is pulled out, the spring 49$^x$ serving to return the pull bar and also the plate to their normal positions. The slotted portion of the pull bar has a longitudinal movement in the grooves 53 formed opposite each other in the inner faces of said plates 48. The lever 49 is pivotally mounted upon a pin 54 carried by the bracket arm 55 which is fastened to the rods 7. The lower end of the lever is pivotally connected, through the medium of the pin 56, with the stem 6 carrying the valve regulating the exit opening in the tank.

Adjustably mounted upon the stem 28 is a collar 60, and 61 designates a lever which is pivotally mounted upon a pin 68 carried by a downwardly curved finger 69 upon the arm 32 and one end of the lever 61 is pivotally connected to the socket member 62 and its free end is disposed in the path of the collar 60 upon the float stem. Said socket member 62 has interior threads therein for the reception of the upper end of the rod 62', and 64 is a jam nut mounted upon the threaded rod 63 and bearing against said socket member. A spring 65 is fastened at one end to said socket member and its other end to an adjustable screw eye 66 carried by the bracket 67 upon the inner surface of the tank.

The lower end of the rod 62' is pivotally connected to the long arm of the releasing latch lever 70 which is pivotally mounted upon a pin 71 carried by the hollow stem 12 and the short arm of the latch lever 70 is adapted to pass through an aperture 72, to engage the notch 8 in the hollow stem 6 when the float rises sufficiently to cause the collar on the stem thereof to tilt the lever 61, also the lever 70 connected thereto and which tilting movement of the latch lever, when it engages the notch in the stem, will cause the inlet valve to be retained open until the rod 63 is pushed down to throw the latch lever out of engagement with the notch in the hollow stem, after which the tension of the spring 16 will close the inlet valve.

The operation of the apparatus will be readily understood and is as follows: When it is desired to dispense liquid from the tank, the coin is placed in the coin slot and falls down to a position behind the lever and adjacent to the inner curved edge of the plate 48ˣ, the free end of which plate passes through the slot in the pull bar and is moved by the latter upon its outer throw. The apparatus is now in shape to allow the liquid to be dispensed when the pull bar is drawn out. The coin, which drops in the slot, lodges behind the lever and intermediate the same and the free edge of the tilting plate 48ˣ and, when the pull bar is drawn out, said plate will push the coin against the upper end of the lever and cause the same to tilt and, by reason of the lever 49 being pivotally connected to the valve stem, will impart an inner longitudinal movement to the latter and open the valve 9 controlling the exit opening in the tank. By reason of the elongated slot in the pull bar, when the same is released, the spring 49ˣ will return the pull bar to its normal position independent of the movement of the lever, the latter swinging idly at its upper end in the slot of the pull bar when the valve stem returns to its normal position. As the stem moves to open the exit valve, the spring 14 will be put under tension and the pawl 21 will be thrown by the spring-pressed lever 20 into engagement with the notch 7 and hold the exit valve open. As the valve stem 6 is actuated by the lever 49, the short end of the releasing lever 70 will engage the notch 8, the lever 70 being held in its engagement with said notch 8 through the medium of the spring 65, the tension of which is regulated by the screw eye 66. When the float lowers riding upon the surface of the liquid and comes in contact with the antifriction roller 26, the lever 20 will tilt upon its pivot 19 and throw the pawl 21 out of engagement with the notch 7 in the valve stem and this will allow the spring 14 to quickly cause the valve controlling the exit opening to seat and shut off further dispensing of the liquid.

Simultaneously with the closing movement of the valve regulating the exit opening, the hollow stem 12, which is connected to the valve 13 regulating the inlet opening, will be caused to move with the stem 6 by reason of the short end of the lever 70 being in engagement with the notch 8 and thereby quickly opening the inlet valve and which movement of the hollow stem will put the spring 16 under tension. The exit valve being closed and the inlet valve being open, the tank will be replenished with liquid to its measured capacity and, when the collar 60 comes in contact with the lever 61, the latter will tilt and, through its connection with the lever 70, will cause the latter to tilt and release its opposite end from the notch 8, thus allowing the spring 16 to return the hollow stem to its normal position and cause the inlet valve to seat.

It will be noted that, as the float lowers, which will take place during the dispensing of the liquid, the slide 41 will automatically close the coin slot to prevent the insertion of the coin until the supply of liquid in the tank is replenished, the slide rising with the float by reason of the stem of the latter coming in contact with the lever carrying the slide.

By the provision of an apparatus embodying the features of our invention, it will be noted that a simple and efficient gasolene vending apparatus is provided in which the mechanism is automatic in its action, positively shutting off the supply after the measured quantity has entered the receptacle.

What we claim to be new is:

1. A gasolene vending apparatus comprising a tank with inlet and exit openings therein, an exit valve, a spring-pressed notched stem fixed to said valve, means for moving the stem to open the exit valve, a float-actuated pawl for engagement with the notch of the stem to hold the valve open, an inlet valve with a spring-pressed stem upon which the same is mounted, means for causing the stems to move together, and float-actuated mechanism for releasing said means to allow the inlet valve to seat independent of the exit valve.

2. A gasolene vending apparatus comprising a tank with inlet and exit openings therein, an exit valve, a spring-pressed notched stem fixed to said valve, means for moving the stem to open the exit valve, a float-actuated pawl for engagement with the notch of the stem to hold the valve open, an inlet valve with a spring-pressed stem upon which the same is mounted, a pivotal releasing lever for causing the stems to move together in one direction, and float-actuated mechanism for operating the releasing lever to allow the inlet valve to seat independent of the exit valve.

3. A gasolene vending apparatus comprising a tank with inlet and exit openings therein, an exit valve, a spring-pressed notched stem fixed to said valve, means for moving the stem to open the exit valve, a float-actuated pawl for engagement with the notch of the stem to hold the valve open, an inlet valve, a spring-pressed hollow stem upon which the same is mounted and adapted to telescope over the stem upon which the exit valve is mounted, a tilting lever mounted upon the hollow stem and engaging a notch in the other stem, a float within the tank, and means actuated thereby for tilting said releasing lever to allow the inlet valve to seat independent of the exit valve.

4. A gasolene vending apparatus comprising a tank with inlet and exit openings therein, an exit valve, a spring-pressed notched stem fixed to said valve, means for moving the stem to open the exit valve, a float-actuated pawl for engagement with the notch of the stem to hold the valve open, an inlet valve, a spring-pressed hollow stem upon which the same is mounted and adapted to telescope over the stem upon which the exit valve is mounted, a tilting lever mounted upon the hollow stem and engaging a notch in the other stem, a float within the tank, a stem to which the float is attached, a collar upon the float stem, a tilting lever actuated by said collar, and connections between the collar-actuated lever and the releasing lever for allowing the inlet valve to seat independent of the exit valve.

5. A gasolene vending apparatus comprising a tank with inlet and exit openings therein, an exit valve, a spring-pressed notched stem fixed to said exit valve, means for moving the stem to open the exit valve, a spring-pressed pawl adapted to engage the notch in the stem, a member to release said pawl, a float for engagement with said member, an inlet valve, a hollow spring-pressed stem upon which the same is mounted and adapted to telescope over the stem upon which the exit valve is mounted, a pivotal lever mounted upon the hollow stem adapted to engage a notch in the other stem, a stem upon said float, a collar upon the float stem, a pivotal lever in the path of said collar, and a rod pivotally connecting the collar-operating lever and the lever upon said hollow stem.

6. A gasolene vending apparatus comprising a tank with inlet and exit openings therein, an exit valve, a spring-pressed notched stem fixed to said exit valve, means for moving the stem to open the exit valve, a spring-pressed pawl adapted to engage the notch in the stem, a member to release said pawl, a float for engagement with said member, an inlet valve, a hollow spring-pressed stem upon which the same is mounted and adapted to telescope over the stem upon which the exit valve is mounted, a pivotal lever mounted upon the hollow stem adapted to engage a notch in the other stem, a stem upon said float, a collar upon the float stem, a pivotal lever in the path of said collar, a socket member to which said collar-actuated lever is pivoted, an adjustable spring connected to said socket member, and a rod fastened to the latter and having pivotal connection with the lever upon said hollow stem.

In testimony whereof we hereunto affix our signatures in presence of two witnesses.

HOMER FOSTER.
WILLIAM C. TURNER.
CLARENCE E. BENNETT.
WALTER B. LINN.

Witnesses:
  GEO. G. ROBERTSON,
  JOHN DIXON.